(12) United States Patent
Schie et al.

(10) Patent No.: US 6,940,733 B2
(45) Date of Patent: Sep. 6, 2005

(54) OPTIMAL CONTROL OF WIDE CONVERSION RATIO SWITCHING CONVERTERS

(75) Inventors: David Chalmers Schie, Cupertino, CA (US); Alexander Mednik, Campbell, CA (US); James Hung Nguyen, San Jose, CA (US); Sang Ton Ngo, Cupertino, CA (US); Khai Minh Le, Saratoga, CA (US); Wei Gu, San Jose, CA (US); Larry Kerenyi, White Plains, NY (US)

(73) Assignee: Supertex, Inc., Sunnyvale, CA (US)

( * ) Notice: Subject to any disclaimer, the term of this patent is extended or adjusted under 35 U.S.C. 154(b) by 105 days.

(21) Appl. No.: 10/646,450

(22) Filed: Aug. 22, 2003

(65) Prior Publication Data

US 2004/0105283 A1 Jun. 3, 2004

Related U.S. Application Data

(60) Provisional application No. 60/404,967, filed on Aug. 22, 2002.

(51) Int. Cl.[7] .............................................. H02M 3/335
(52) U.S. Cl. ..................... 363/21.12; 363/71
(58) Field of Search .............................. 363/15, 16, 20, 363/21.01, 21.12, 21.13, 65, 71; 307/82

(56) References Cited

U.S. PATENT DOCUMENTS

| | | | | |
|---|---|---|---|---|
| 4,648,020 A | * | 3/1987 | Vinciarelli .................... | 363/71 |
| 5,682,303 A | * | 10/1997 | Goad ........................... | 363/71 |
| 6,385,059 B1 | * | 5/2002 | Telefus et al. ........... | 363/21.15 |
| 6,434,021 B1 | * | 8/2002 | Collmeyer et al. ....... | 363/21.01 |
| 6,862,194 B2 | * | 3/2005 | Yang et al. .................... | 363/16 |

* cited by examiner

Primary Examiner—Adolf Berhane
(74) Attorney, Agent, or Firm—Jeffrey D. Moy; A. Mitchell Harris; Weiss, Moy & Harris, P.C.

(57) ABSTRACT

A switch state controller generating a pulse train is used in a power converter utilizing a plurality of converter stages all simultaneously controlled by a single switch controlled by said pulse train. On time of the pulse train is controlled according to an input or interim node characteristic of the supply and period is controlled by a characteristic of the output of the converter. This allows development of AC-to-DC converters, including power-factor-correction converters, and DC to DC converters with high conversion ratio with minimal parts count & high reliability.

41 Claims, 3 Drawing Sheets

OPTIMAL CONTROL OF WIDE CONVERSION RATIO SWITCHING CONVERTERS

RELATED APPLICATIONS

This application is related to U.S. provisional application Ser. No. 60/404,967, filed Aug. 22, 2002, in the name of the same inventors listed above, and entitled, "OPTIMAL CONTROL MEANS FOR AC/DC MULTICONVERTERS TO ACHIEVE HIGH INPUT POWER QUALITY AND TO ALLOW CONTROLLABLE DRIVE WAVFORMS" The present patent application claims the benefit under 35 U.S.C. §119(e).

BACKGROUND OF THE INVENTION

1. Field of the Invention

The present invention relates generally to control of power supplies, and more specifically to methods and apparatus for converting from a widely varying input voltage, such as a rectified AC voltage or a filtered DC voltage, to an output current or voltage.

2. Background of the Invention

Cascaded converters have been demonstrated which efficiently convert widely varying input voltages, such as a rectified AC input voltage, or DC voltages such as those found in an automotive or truck battery voltage, to voltages or currents significantly larger or smaller than said inputs. Certain of these converters include a single switch cascaded converter such as a buck-boost-buck converter.

An efficient controller for these types of converters would divide out changes in frequency with input line; would allow sensing the negative voltages associated with such topologies; and would contend with the widely varying currents or voltage magnitudes and polarities being sensed to feedback output information to these topologies.

An example application for such converters would be the driving of high power LEDs. These LEDs require a fixed DC current and may be dimmed either by varying the current magnitude or producing a current pulse train which is better for LED lifetime.

Solid state illumination sources, LEDs, capable of replacing incandescent and fluorescent lamps have recently been demonstrated. These LEDs last longer and are more efficient than existing sources, however, the heat they produce is conducted rather than radiated. The result is extremely high operating temperature beyond the capability of standard power supplies containing electrolytic capacitors. Further, light fixtures typically do not have space for a power supply and a lamp, therefore to retrofit existing applications extremely small power supply form factors must be created.

It would therefore be desirable to incorporate the above controller into an integrated circuit which can operate from high input voltages, stay operational for a non-filter input such as a rectified AC signal or a phase controlled AC signal, and to provide open load, under voltage and other protections for the power supply. It would be desirable if the resulting supply was small enough to mount in retrofit form factors, is capable of high temperature operation for long periods of time, could regulate an output current, and could be mounted close to the illumination source.

It would be desirable in one embodiment to provide a power factor corrected power supply such that the power supply looks to the AC line like a resistive element.

It would further be desirable in another embodiment to reduce filter requirements by drawing constant power or near constant power through the converter so that input current varies inversely with instantaneous input voltage. To prevent over currents during the "cusps" or low voltages observed in an rectified AC waveform, it would be desirable to engage a filter only once reaching a voltage low enough to allow use of low ESR capacitors so that filtering components values and sizes may be minimized and so that components such as electrolytics with poor high temperature reliability may be eliminated from the circuit.

Therefore, it would be desirable to provide a method and apparatus for overcoming the problems discussed above.

SUMMARY OF THE INVENTION

In accordance with one embodiment of the present invention, a power supply circuit is disclosed. The power supply circuit has a switch state controller for producing a pulse train. A frequency of the pulse train is controlled by a feedback signal coupled from an output characteristic of the power supply circuit. The switch state controller is coupled to one of an input or an internal node of the power supply circuit for controlling the on time of each pulse in the pulse train, primarily to divide out frequency variation with input line changes.

In one embodiment the on time is varied inversely with the instantaneous input voltage to produce a constant power converter. In another, the on time is varied inversely with the RMS value of the input to produce power factor correction when boost or flyback stages represent the first cascaded stage. Yet other embodiments allow sampling of internal nodes to set on time.

A plurality of cascaded converter stages is coupled between the input and the output. Each of the cascaded converter stages have all switch control coupled to the switch state controller whereby each of the plurality of converter stages is switched by the pulse train.

In accordance with another embodiment of the present invention, the power supply circuit above is coupled to a feedback circuit. The feedback circuit comprises differential inputs wherein each terminal of the differential inputs is coupled to a separate transconductor. A current sensing element is coupled to the differential inputs. The transconductors and the current sensing element allow selection of arbitrary voltage across the current sensing element and choice of polarity.

In accordance with another embodiment of the present invention a frequency controller is disclosed. The frequency controller has a current detector coupled between a first transconductor and a second transconductor. A first integrator is coupled to the first transconductor. A second integrator is coupled to the second transconductor. A comparison device is coupled to the first and second integrators. A charge pump coupled to the comparison device. A voltage-to-frequency converter coupled to the charge pump. A period of the frequency controller is adjusted in conformance with a detected current.

In accordance with another embodiment of the present invention, a power supply circuit is disclosed. The power supply circuit has a rectifier coupled to an input of the power supply circuit for producing a rectified power signal from an AC input voltage. A plurality of cascaded converter stages is provided wherein a first of the cascade converter stages has an input coupled to an output of the rectifier. The converter stages are used for providing conversion of the rectified power signal to a DC output, via charging and discharging of the energy storage elements. A switching device is provided for switching the plurality of converter stages whereby an output of the power supply is maintained substantially constant as the rectified power signal varies in instantaneous amplitude. A switch state controller is coupled to the switching device so the on-time is varied inversely with an instantaneous rectified AC amplitude and the period is set in conformity with a measured power supply output characteristic. The result is a near constant power converter. A protection feature to ensure that large currents are not drawn during the low voltages or "cusps" in the rectified AC waveforms requires the clamping of the pin connected to the circuit controlling on time to a minimum voltage.

In accordance with still another embodiment of the present invention, a power factor correction device is disclosed. The power factor correction device has an integrated circuit containing a switch state controller wherein the switch state controller is used for producing a pulse train. A frequency of the pulse train is controlled by a feedback signal coupled from an output characteristic of the power supply circuit. The switch state controller is coupled to one of an input or internal node of a power supply circuit for controlling the on time of each pulse in the pulse train, wherein the switch state controller has a feedback circuit coupled to the switch state controller for controlling a frequency of the pulse train in conformity with an output characteristic of the power supply output. A resistor divider circuit is coupled to a rectified AC voltage source and to a pin coupled to a circuit controlling the on time. A filter is coupled to the resistor divider to produce a filtered DC voltage at said pin proportional to the RMS value of the rectified AC input voltage. A method to produce an under-voltage lockout for such a circuit as well as a method to maintain power to operate the circuits within the integrated circuit even when input voltage falls is also disclosed.

In accordance with another embodiment of the present invention, an open load or over voltage protection circuit is disclosed. The overvoltage protection circuit has an integrated circuit containing a switch state controller wherein the switch state controller is used for producing a pulse train. A frequency of the pulse train is controlled by a feedback signal coupled from an output characteristic of the power supply circuit. The switch state controller is coupled to one of an input or internal node of a power supply circuit for controlling the on time of each pulse in the pulse train, wherein the switch state controller has a feedback circuit coupled to the switch state controller for controlling a frequency of the pulse train in conformity with an output characteristic of the power supply output. A clamp is provided for connecting one of an integrated circuit feedback transconductor terminals to a power converter output voltage. A clamp is also provided from an output voltage to ground/common.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
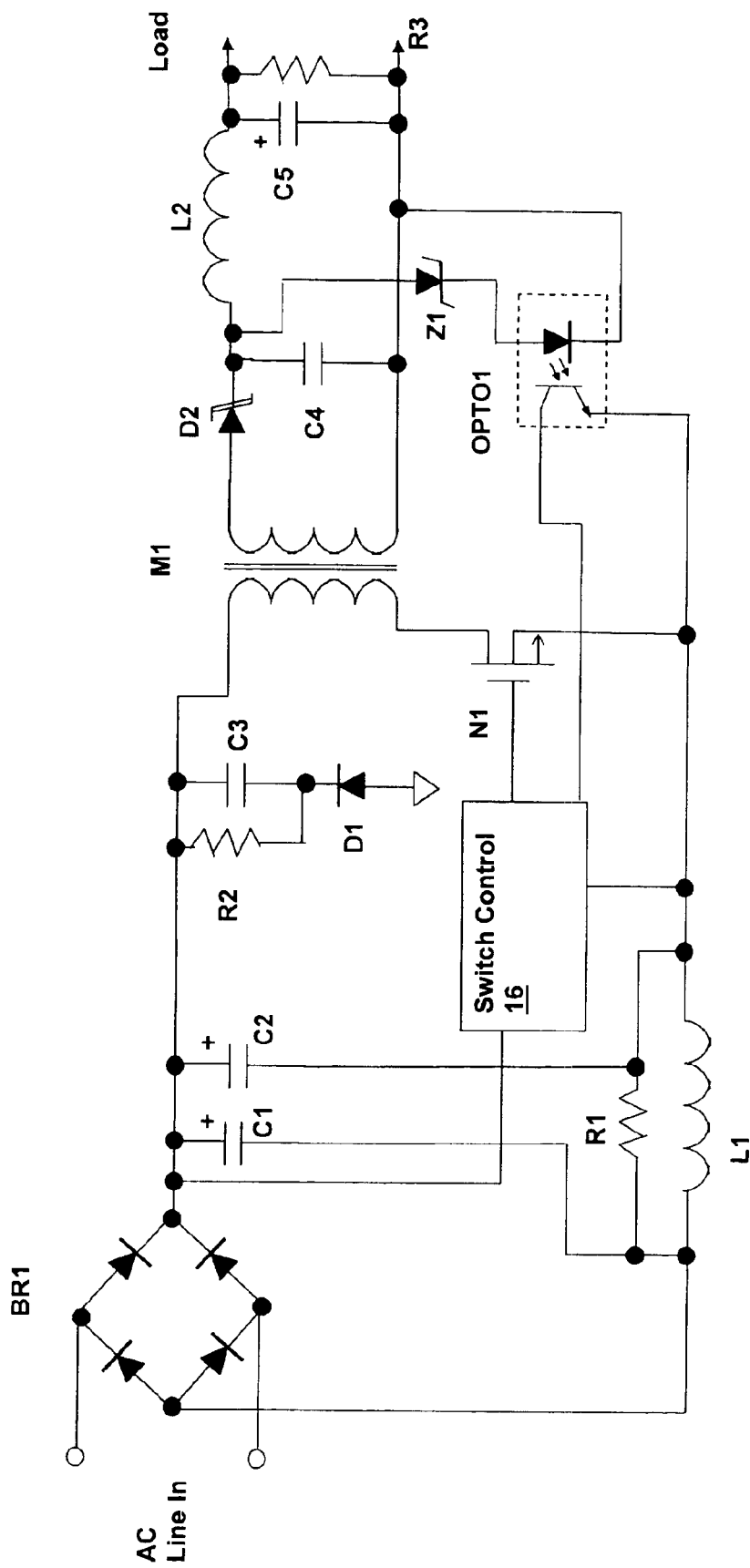
FIG. 1 is a schematic diagram depicting a prior art power supply.

Referring to FIG. 1, a prior art power supply is depicted. A bridge BR1 full-wave rectifies an AC line input to produce an input power source. Filter capacitors C1 and C2 average the voltage at the output of bridge BR1 to produce a DC voltage (approximately 360 Volts DC without load). Without filter capacitors C1 and C2 the power supply cannot change control function (e.g., duty cycle in a pulse-width modulated (PWM) power supply) as the input waveform varies in voltage from 0V to 360V. The control function dynamic range required to accomplish proper line regulation, which is the power supply's rejection of input voltage variation, is too wide for operation without filtering. An inductor L1 is coupled between capacitors C1 and C2 to provide inrush protection and electromagnetic interference EMI filtering. A resistor R1 is used to set the initial inrush current, providing a soft-start current to charge capacitor C2 until the field produced in inductor L1 collapses.

The power supply of FIG. 1 is of typical design well-known in the art as a flyback converter. A transformer M1 couples energy from its primary side by the action of a switch implemented by a transistor N1. N1 is controlled by a switch control 16, typically a pulse-width modulator that varies duty cycle in conformity with a feedback signal provided from the circuit coupled to the secondary of transformer M1. A resistor R2, a capacitor C3 and a diode D1 form a "snubber" circuit that absorbs the current spike produced when transistor N1 is turned off that would otherwise produce a voltage spike on capacitor C2 (and a spike on capacitor C1 that will be reduced depending on the characteristics of inductor L1).

The secondary side of transformer M1 comprises a half wave rectifier implemented by a schottky diode D2 and a filter formed by capacitor C4 inductor L2 and capacitor C5. The filter removes the higher harmonics of the switching waveform (pulse) that is coupled from the primary side of transformer M1 to the secondary. A zener diode Z1 and optocoupler OPTO1 provide a feedback signal to switch control, so that the pulse width of the signal controlling the gate of transistor N1 may be varied to produce a constant voltage at capacitor C5 as load current and AC input voltage vary. A resistor R3 is coupled across the output terminals of the power supply (load terminals) and is generally necessary to produce a stable no-load operating point, but may be unnecessary in some implementations, where the minimum pulse width of the switch is sufficient to produce a stable no-load DC output.

The dynamic control range necessary to operate the power supply as described above without filter capacitors C1 and C2 is too wide for proper operation. For example, a 100 Khz PWM switch-mode power supply would have to produce a pulse width of 5 $\mu$s (50% duty cycle) at an input voltage of 0.67V and a pulse width of 5 ns (0.1% duty cycle) at an input voltage of 360V, in order to provide the equivalent performance of a filtered-input converter that can fully regulate it's control function on a pulse-by-pulse basis. Both the efficiency of such a power supply and the fast switching requirement at the low duty-cycle point make such a solution impractical. Further, present-day switch-mode power supplies typically switch at much higher frequencies, for example 1 Mhz, which exacerbates the above-described problem by a factor of ten.

Figure 2:
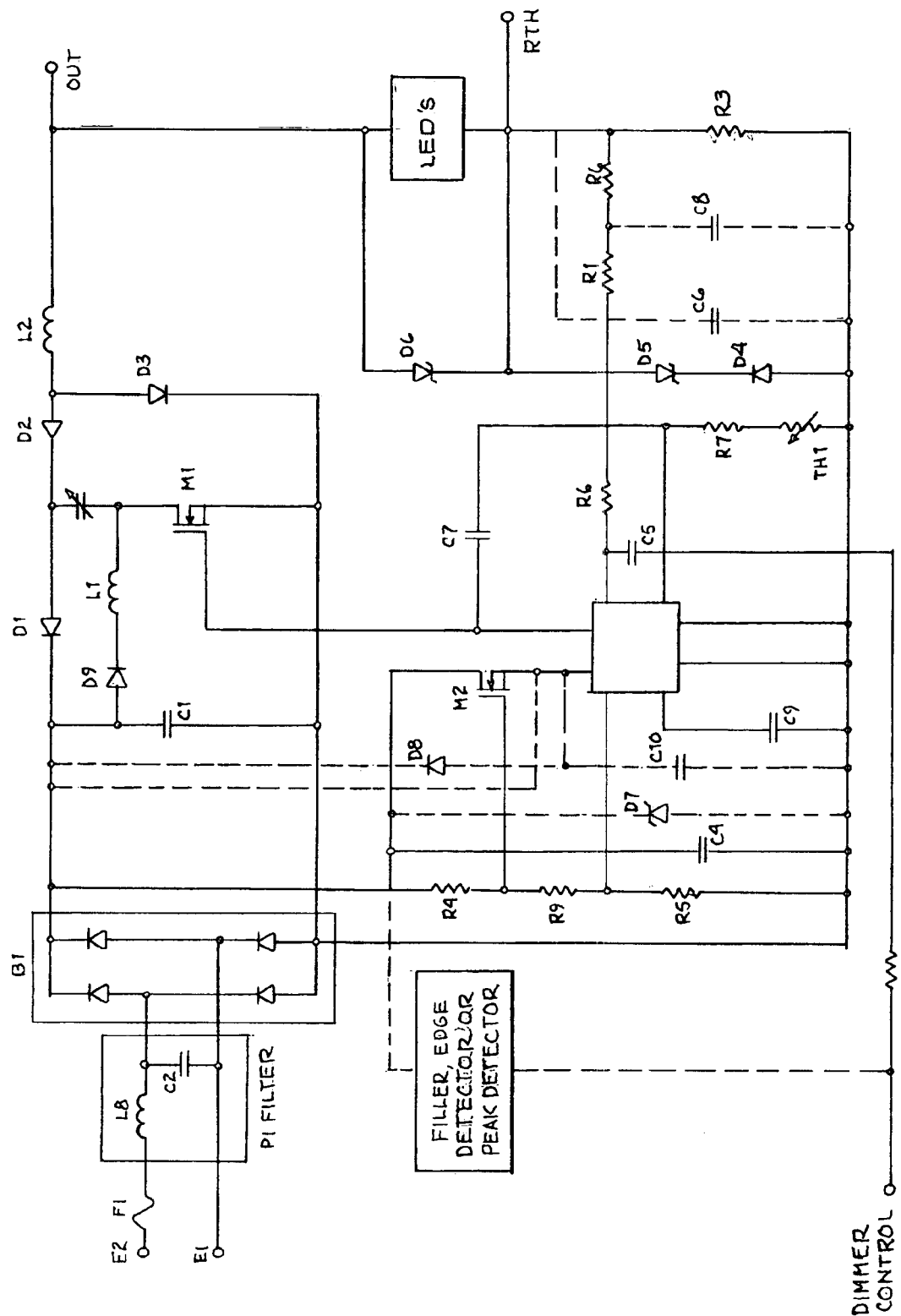
FIG. 2 is a schematic diagram depicting a power supply in accordance with an embodiment of the present invention.
Figure 3:
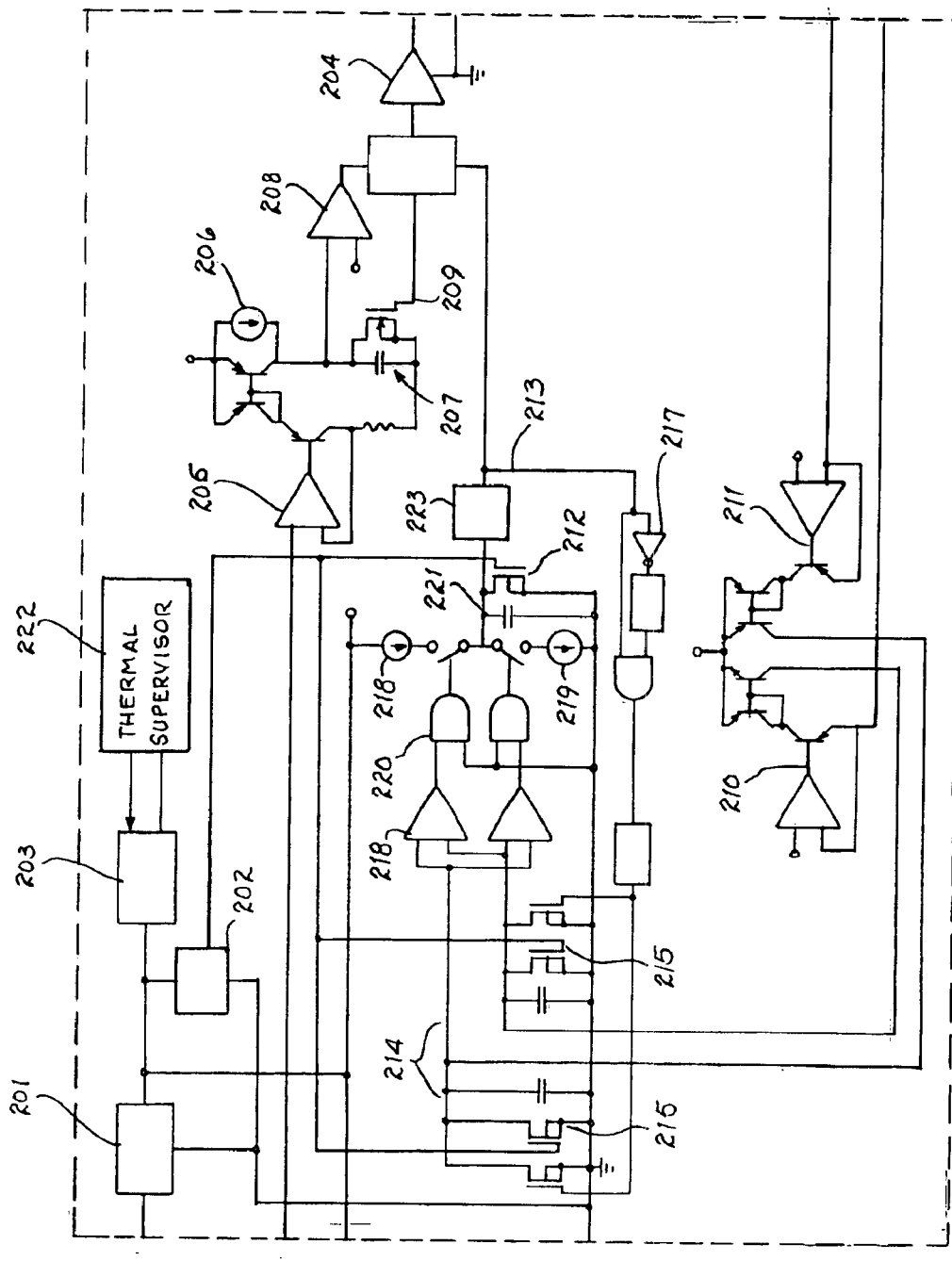
FIG. 3 is a schematic of a controller integrated circuit in accordance with an embodiment of the present invention.

Referring to FIG. 2 one embodiment of a power supply having a switch state controller (FIG. 3) is shown. E1 & E2 are input terminals which may be coupled to an AC source, such as a pure AC signal, a phase controlled AC signal or other signal. The listing of the above should not be seen as to limit the scope of the present invention. L3 & C2 are a conducted emissions filter meant to provide a high frequency path back to the power supply for high frequency signals it generates and to provide a high frequency impedance between the AC input and the power supply to block higher frequency signals generated by the power supply.

A rectifier device 1 couples the AC signal to the power supply input terminals. The power supply is a multiconverter. There are two converter stages switched by a single switching device, the switching device controlled by a controller integrated circuit 3. A buck second stage is shown but could be replaced by any second stage DC/DC converter.

The first converter stage has an input from the most positive terminal of the input rectifier and the drain of MOSFET M1. The second converter stage has an input from the anode of D1, cathode of D2 and negative terminal of C3 and the source of MOSFET M1.

C1 provides a low impedance path for high frequency signals associated with the switching of M1. There are two states, one when the switch M1 is ON and one when the switch M1 is OFF. During the ON state, inductor L1 and diode D9 are placed across the rectified AC voltage across the full bridge causing the current in L1 to rise at a rate of (Vbridge-VD9)L1. At the same time the voltage previously stored on C3 is placed across the load, 2, inductor L2, sense resistor, R3, and diode D2, causing the current to rise in L2 according to (VC3-Vload-VD2-VR3)/L2. During the OFF state, L1 transfers energy to C3 through D1 and D9. At the same time L2 freewheels through D3, sense resistor R3, and the load, 2.

Control circuit U1 may be connected directly across the rectified DC input, or may be connected as shown in FIG. 8. This connection uses M2 in a source follower configuration to provide undervoltage lockout and also to divide heating between M2 and U1. A resistor divider R4, R9 & R5 is the reference for the source follower and is programmed such that the source of M2 will reach the under voltage lockout (UVLO) of the controller U1 at the desired UVLO threshold of the filtered rectified AC input. Alternatively if a higher effective UVLO than programmed into the integrated circuit, U1, is not needed and the integrated circuit package is thermally capable (the source follower transistor would otherwise handle a large portion of the thermal dissipation), then a high voltage regulator, 201, within the integrated circuit U1 may be connected directly across the rectified AC input without the need for follower means, M2. Another option is to reference the source follower, M2, to a specific voltage for example using a shunt device 5, so that the highest voltage rated capacitor which is not electrolytic (and therefore can operate at high temperatures), C6, may be connected to its source. A blocking device such as a diode coupled from this source D8, which is also coupled to the integrated circuit U1 regulator, 201, may then be coupled to the input of the power supply as a energy reservoir (power source) during the time that the rectified AC input falls below the capacitor voltage, C10. In such an instance an alternate signal conforming to the average or peak magnitude of the rectified AC input would need to be scaled and coupled to the Von, pin 2 of integrated circuit U1. In an alternative embodiment where the ON time is varied instantaneously with the rectified AC input voltage, this can reduce current spikes. In this embodiment it will reduce output filter requirements and reduce the size of the energy storage capacitor, C3.

An internal regulator coupled to pin 1 of U1 is internally coupled to C6 which stores energy to provide a powering mechanism for U1 during the time that the voltage on U1 pin 1 falls below the voltage on C6. C6 further provides a low impedance charge source to drive the switching MOSFET M1.

Pin 2 of control circuit U1 is connected to a scaled and filtered signal proportional to the rectified AC input. U1 Pin 2 also controls the ON time of the MOSFET M1. By holding U1 pin 2 at a substantially constant voltage for a given AC input magnitude, the on time of the switch will be substantially constant and therefore for a relatively fixed switching frequency the average input current will be drawn in proportion with the input voltage—the result is high input power quality with PF>90% and THD<15%.

The control circuit U1 includes a differential integrating feedback which works to achieve parity between two feedback currents flowing out of U1 pin 5 and U1 pin 6. To reach current parity it is necessary to produce a voltage at pin 5 such that Vpin5/(R7+Rth1) is equal to (Vpin6−VR3)/(R1+R6+R8). This programming method allows a pseudo-programmable sense voltage, across R3, to be selected as desired based on the above current balance. Rth1 illustrates that temperature dependent impedance devices such as an NTC or PTC may be used to adjust the feedback to provide the desired average current through the load at different temperatures.

The control circuit in U1 produces independence between the feedforward and feedback sections of the circuit. The feedback maintains a substantially constant feedback voltage with C5 & C8 in combination with resistor R1, R8 producing an optional low pass filter, which may not be needed depending upon the choice of compensation components C7 & R2, the size of C3 & L2, in conformance with the acceptable ripple in the load, 2. Resistor R3 is the sense resistor. The sense resistor voltage to be regulated may be chosen to be large in magnitude, such as −2.5V to escape the noise floor or alternatively may be chosen to be small such as −165 mV to save energy. An innovative feedback means which includes comparing the voltage developed across matched integrators, 214, does not require filtering of the feedback signal to close the loop.

A capacitor C9 is connected across the differential input to provide a high frequency short. This is used to compensate for finite slew rates on the VCCS operational amplifiers which otherwise would cause a DC error (high frequency components within the bandwidth of the op amps but beyond its slew rates may have differing rise and fall slopes producing a net DC error after integration).

Compensation is achieved using C7 and R2 coupled between the gate output and the differential input of U1. If U1 is considered as a gain element from its differential input to the gate output, then it is easily seen that the C7 and R2 create a pole and a zero to allow compensation programming.

Protection is provided in three forms. Firstly there is a thermal shutdown or limit circuit with hysteresis, 222, to protect against die overtemperature. There is an internal shutdown logic or restart means if the internal VCO control register reaches an upper limit (ie. the loop does not close within the charge up time of the VCO register, 221). The third is an overvoltage clamp through D6 means which pulls additional current from the U1 pin 6 if the voltage across the load grows too large, to lower the frequency and quantity of energy transferred per cycle. D5 and D4 provide further overvoltage breakdown clamping if a fast overvoltage occurs more quickly than U1 is able to react.

The multiconverter topology, due to the storage element, C3, and elimination of a L1 discharge path to the input which would dissipate power, allows operation with a phase control signal, such as that produced by a typical wall dimmer. To use LED solid state lighting in retrofit applications it would be desirable if the LED drive signal were to dim and operate from such an input signal. The circuit in FIG. 8 will operate from such a signal if a peak detector, edge detector or averaging filter, 4, is coupled to the rectified AC input so that a signal proportional to the extent of phase change is communicated. This dimming signal may be coupled to U1 through a resistor, R11, for example and summed into the differential feedback to change the average load, 2, current to accomplish dimming. Whether operating from pure AC or from an phase controlled AC signal, the ripple through the load, 2, may be programmed to any desired level using one or more means including the choice of C3, the choice of compensation components C7 & R2, a low pass filter coupled from the sense resistor, R3, to the differential feedback of U1, for example R1, C5, R8 & C8, and/or through the use of an energy reservoir capacitor coupled to a follower, M2, and through a diode to the power supply input.

In certain LED applications, such as where Kelvin temperature and CRI must be maintained at certain levels, it is desirable to maintain a constant current profile in the LEDs. This constant current is not the average current, but rather the rise time and peak current operating in discontinuous mode. In other words a consistent current profile when current is flowing, even if current does not flow throughout the high frequency cycle. A second embodiment in which the load current, 2, waveform is measured, for example by coupling a measuring circuit to L2, whose peak current is maintained constant even while the average current varies to dim in L2 DCM, may be used to maintain a constant color spectrum, CRI & Kelvin temperature while dimming.

In certain applications, it may be desirable to further modify the operating characteristics of the converter in conformance with optically measured parameters and/or temperature. In such a circumstance a PTAT signal may be coupled to the differential feedback of U1 as may a signal proportional to a measured color or intensity. Such measurements may be made with an optical meter fabricated on the same integrated circuit as the switch state controller with an optical aperature provided in the integrated circuit package.

In certain applications it may further be desirable to mount solid state LEDs capable of replacing light sources, near to the AC/DC power supply with controller, to produce a form factor capable of retrofitting existing lighting sources. High power (>=1W) LEDs produce too much conducted heat for the use of conventional power supplies, which contain electrolytic capacitors, to operate for long periods of time in confined common lighting form factors, such as track fixtures, recessed downlights, or traffic light housings, etc. from which removal of heat is difficult.

Further, it is necessary to provide a mechanical means whereby the heat generated by LEDs and by the power supply may be conducted away to retain a reasonable operating temperature. Such a solution is possible using a multiconverter and controller, using the methods taught herein to eliminate the need for any electrolytic capacitors or components with short life at high temperatures (>90 C), and by using the same heatsink, such as an aluminum substrate PCB board, to couple heat away from both the LEDs and from the power supply.

Examples of retrofit solutions which would utilize a multiconverter & controller in close proximity with the LED source would include MR16 form factor LED lamp replacements, small form factor lamps in elevators and vending machines, and PAR lamp replacements for traffic lights, recessed downlights, spot lights and track lights. The result would be high input power quality (>90% power factor, <15% THD), small size, long life at high temperature, and the 30% or less peak to average ripple desired in high power solid state LEDs such as the newly introduced Luxeon 1W or 5W White, Green, Amber, Blue & RED LEDs. The system would also be compatible with phase controlled AC dimming circuits commonly found in the incandescent electrical circuits likely to be targeted for solid state lighting retrofits to increase lamp life and efficiency.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A power supply circuit comprising:
    a switch state controller for producing a frequency modulated pulse train, a frequency of the pulse train controlled by a feedback signal coupled from an output characteristic of the power supply circuit, the switch state controller coupled to one of an input or internal node of the power supply circuit for controlling the on time of each pulse in the pulse train; and
    a plurality of cascaded converter stages coupled between the input and the output, each of the cascaded converter stages having all switch control coupled to the switch state controller, whereby each of the plurality of converter stages is switched by the pulse train.

2. The power supply circuit of claim 1, wherein the switch control of the converter stages comprises a single switch for controlling all of the converter stages.

3. The power supply circuit of claim 1, wherein the input is a rectified AC voltage, the on-time is varied inversely with the RMS magnitude of the rectified AC voltage, and the first cascaded converter is one of a flyback type or boost type resulting in power factor corrected, low total harmonic distortion operation for a non-changing output.

4. The power supply circuit of claim 1, wherein the switch state controller comprises a voltage-to-frequency converter for producing a pulse train of controlled period in conformity with a feedback signal.

5. The power supply circuit of claim 1, further comprising a feedback circuit coupled to the switch state controller for controlling a frequency of the pulse train in conformity with an output characteristic of the power supply output.

6. The power supply circuit of claim 5, wherein the feedback circuit comprises:
    differential inputs wherein each terminal of the differential inputs is coupled to a separate transconductor; and
    a current sensing element coupled to the differential inputs; and
    the transconductors and the current sensing element allowing selection of arbitrary voltage across the current sensing element and choice of polarity.

7. The power supply circuit of claim 6, wherein the feedback circuit further comprises a pair of integrators, wherein each integrator is coupled to one of the transconductors and the integrators being periodically reset.

8. The power supply circuit of claim 7, wherein the feedback circuit further comprises a comparison circuit to determine which of the integrators is of greater peak amplitude at an end of an integration time and before being periodically reset.

9. The power supply circuit of claim 8, wherein saturation of at least one of the integrators will result in an increase in a voltage to frequency control register voltage to allow startup.

10. The power supply circuit of claim 8, further comprising a charge pump coupled to the output of the comparison circuit to control the pulse train period.

11. The power supply circuit of claim 5, wherein the feedback circuit is adjusted with temperature.

12. The power supply circuit of claim 6, wherein the feedback circuit further comprises a separate control input coupled to the differential input allowing adjustment of feedback in conformance with the control input.

13. The power supply circuit of claim 12, wherein the control input is selected from a group consisting of: a PWM input signal, a voltage signal, a peak detected phase control signal, a voltage signal derived from an edge of a phase control signal, or a control signal derived from a LED brightness detector.

14. The power supply circuit of claim 12, wherein the control input is a control input signal derived from a LED brightness detector.

15. The power supply circuit of claim 1, wherein the switch state controller further comprises a voltage-to-frequency converter for producing the pulse train period in conformity with an output of the feedback circuit, and wherein an output of the comparator determines charging and discharging of a capacitor at the input of voltage-to-frequency converter.

16. The power supply circuit of claim 15, wherein discharging of the capacitor produces a soft start of the power supply circuit by setting the period to a maximum length.

17. The power supply circuit of claim 15, wherein the switch state controller further comprises:

integrator circuits which are reset in conformance with the period or group of periods;

a comparison circuit which compares outputs of the integrator circuits;

a charge pump circuit which controls the voltage on the capacitor coupled to the voltage to frequency converter each period in conformance with the comparison circuit;

the integrator circuits accepting feedback and causing the period to be adjusted in conformance with the feedback.

18. The power supply circuit of claim 8, wherein the comparator further comprises a deadband for controlling ripple at the power supply output.

19. The power supply circuit of claim 1, further comprising means for determining a control voltage of a voltage-to-frequency converter has exceeded a threshold, whereby a no-load condition is detected, and wherein the switch state controller disables the pulse width modulated output during the no-load condition.

20. The power supply circuit of claim 17, wherein gating of the charge pump is suppressed in conformity with a control signal, causing the voltage to frequency converter to maintain constant period during a suppression time.

21. A power supply circuit in accordance with claim 1, wherein the switch state controller is used for producing a pulse train, a frequency of the pulse train controlled by a feedback signal coupled from an output characteristic of the power supply circuit to the switch state controller, the switch state controller further coupled to one of an input or internal node of a power supply circuit for controlling the on time of each pulse in the pulse train.

22. A power supply circuit in accordance with claim 21, wherein the feedback circuit is coupled to a frequency control input, the feedback circuit used for receiving a signal proportional to an output characteristic of the power supply circuit, for controlling the frequency in conformity with the output characteristic.

23. A power supply circuit in accordance with claim 21 further comprising:

a gate terminal coupled to an output of the switch state controller for coupling to the control input of an external switch;

an input terminal for connecting to the power supply input;

a return terminal for receiving a return signal associated with the power supply input; and a feedback terminal for receiving the output characteristic proportional signal.

24. A power supply circuit in accordance with claim 21, wherein the feedback terminal comprises a pair of feedback terminals for receiving a differential voltage proportional to the output characteristic.

25. A power supply circuit in accordance with claim 21, further comprising an internal high-voltage regulator coupled to the power supply input for providing an internal power supply to internal circuits.

26. A power supply circuit in accordance with claim 21, further comprising an external terminal coupled to an internal high-voltage regulator for coupling to a capacitor external to the integrated circuit, whereby the internal power supply voltage can be filtered without filtering the power supply input and whereby the internal power supply voltage can be maintained at a sufficient voltage level for operation of the internal circuits.

27. The power supply circuit of claim 1 wherein the power supply is mounted in close proximity to an LED load.

28. The power supply circuit of 27 wherein the power supply and LED load share a common heatsink.

29. The power supply circuit of 1 wherein all components have a life rating in excess of 10,000 hours at temperatures in excess of 90C.

30. The power supply circuit of claim 1 wherein the power supply is mounted in close proximity to a display for backlighting.

31. The power supply of claim 1 wherein the power supply is mounted in close proximity to one of an automotive headlight, tail light, indicator, center mount light, dome light, cluster backlight or reading light.

32. The power supply of claim 1 wherein the power supply is configured as one of a retrofit to a MR16 lamp housing; a retrofit to a PAR38 lamp housing; or a retrofit to a miniature base lamps.

33. A power supply circuit in accordance with claim 21, further comprising an internal high-voltage regulator coupled to the rectified AC input voltage for providing an internal power supply to internal circuits.

34. A power supply circuit in accordance with claim 21, further comprising an external terminal coupled to an internal high-voltage regulator for coupling to a capacitor element external to the integrated circuit.

35. A power supply circuit in accordance with claim 21, further comprising a circuit which allows the integrated circuit to remain powered even when the high voltage input falls below the minimum voltage required by the integrated circuit by storing power in a capacitor coupled to a unidirectional high voltage regulator on the integrated circuit.

36. A power supply circuit in accordance with claim 21, further comprising:

an undervoltage lockout circuit;

a shunt element for programming turn on/turn off voltage coupled to the integrated circuit; and a sample and hold coupled to a VON pin.

37. A power supply circuit in accordance with claim 21, further comprising:
   an undervoltage lockout circuit;
   a shunt element for programming turn on/turn off voltage coupled to the integrated circuit; and
   one of na RMS filter or averaging circuit coupled to a VON pin.

38. A power supply circuit in accordance with claim 21, further comprising a linear transistor with high voltage terminal coupled to a DC voltage source.

39. A power supply circuit in accordance with claim 21, further comprising a protection circuit wherein the protection circuit comprises a clamp coupled to a pin and further coupled to a circuit which controls the on time such that a maximum on time is created when the clamp is active.

40. A power supply circuit in accordance with claim 39, wherein the clamp comprises:
   a resistor divider coupled from a DC input voltage to the VON pin; and
   a diode coupled from a VDD pin to a resistor divider.

41. A power supply circuit in accordance with claim 21, further comprising:
   a resistor divider coupled to a rectified AC voltage source and to a VON pin; and
   a filter coupled to the resistor divider to produce a filtered DC voltage at VON proportional to the RMS value of the rectified AC input voltage.

* * * * *